Oct. 22, 1963
G. E. GROSS
3,108,146
FLUID HANDLING DEVICE
Filed Sept. 16, 1959
2 Sheets-Sheet 1
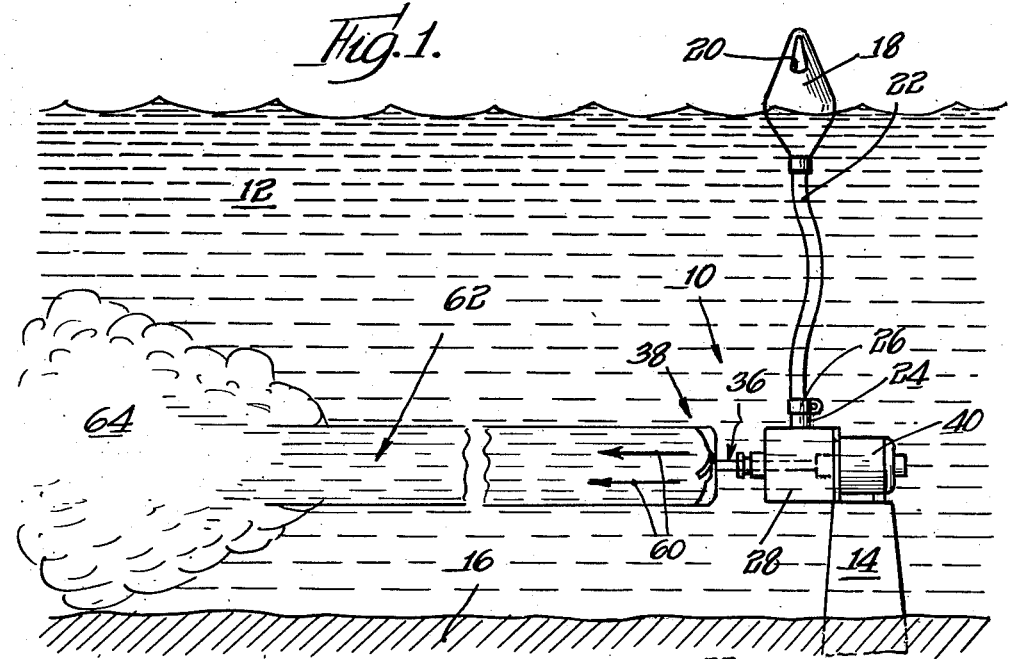
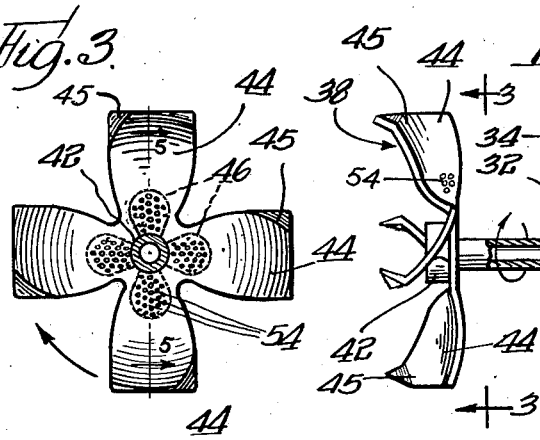
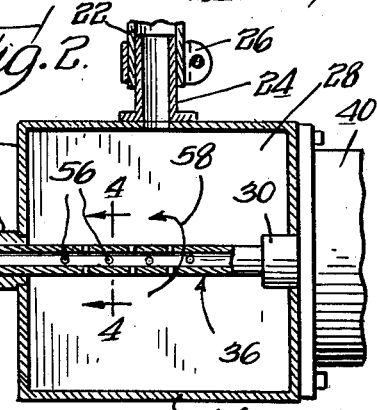
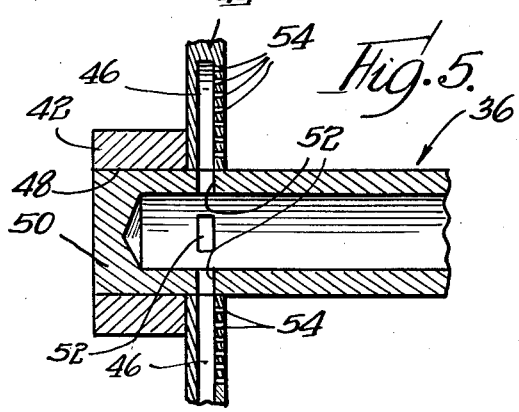
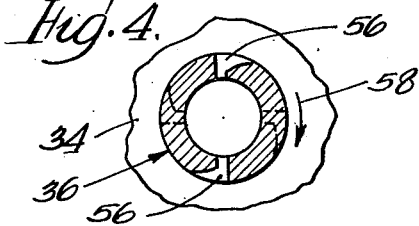
INVENTOR.
George E. Gross
BY
Olson & Trexler
Attys

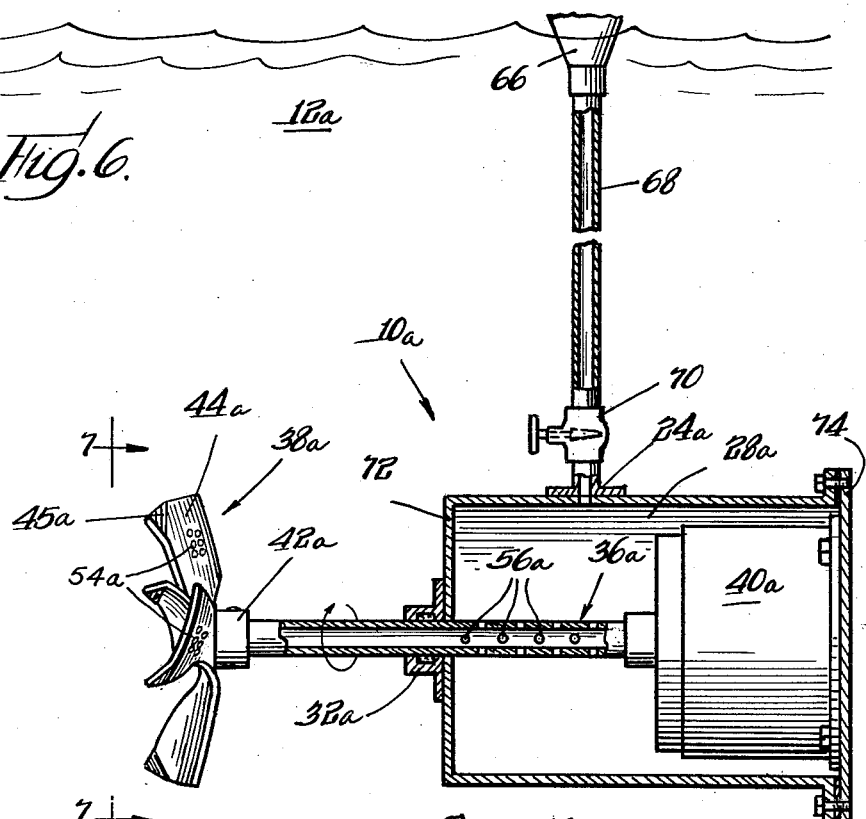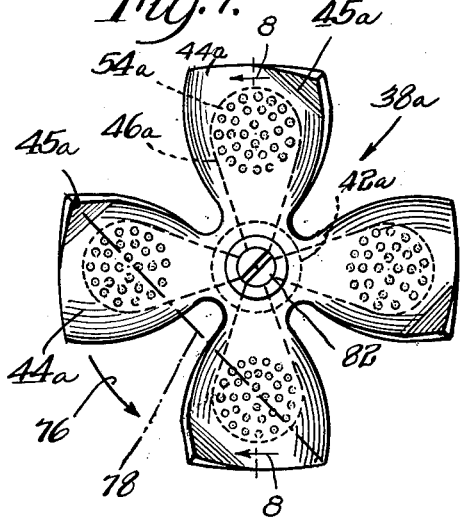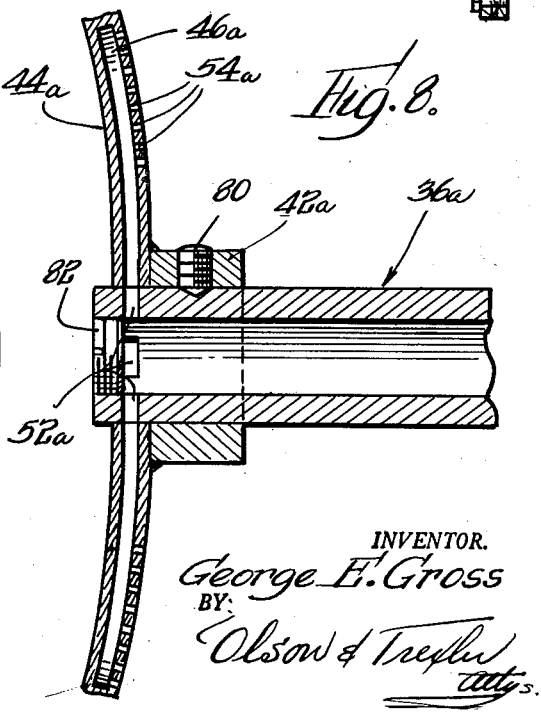

United States Patent Office 3,108,146
Patented Oct. 22, 1963

3,108,146
FLUID HANDLING DEVICE
George E. Gross, 836 S. Maple St., Oak Park, Ill.
Filed Sept. 16, 1959, Ser. No. 840,461
2 Claims. (Cl. 261—24)

This invention relates generally to a device for ductlessly transporting a fluid through a fluid.

In one specific aspect, the present invention relates to a device for oxygenating comparatively large bodies of water.

As is well known, true fishes satisfy their oxygen requirements by absorbing dissolved gas from their watery environment using their gills. Much dissolved oxygen is present by virtue of the metabolic processes of naturally occurring aquatic vegetation while other, smaller quantities become available through surface turbulence trapping air from the atmosphere.

Since many factors, such as the decaying of organic matter, tend to compete with fish for the dissolved oxygen, it frequently becomes necessary to provide supplementary oxygenation in order to maintain adequate oxygen levels. In wintertime particularly, when low temperatures reduce vegetative activities and when ice covers many areas of fresh water, oxygenation is a common conservation practice.

Heretofore, outboard motors have been operated at ice-free areas of the surface of a body of fresh water in order to provide oxygenation. While some benefit has been derived, this procedure is inefficient and wasteful of power. The outboard motor impellers produce large quantities of coarse bubbles which tend to rise quickly to the surface to be broken or to be trapped beneath the surface of the ice. In such instances, there is little opportunity for oxygen to be dissolved in the water. Furthermore, the oxygenating effects have been found to be quite localized, it being quite difficult to direct the oxygenated water away from the impellers for any distance.

Therefore, an important object of the present invention is to provide an improved oxygenating device.

Another object of the invention is to provide an oxygenating device which produces a stream of minute bubbles having little tendency to rise to the surface.

Yet another object of the invention is to provide an oxygenating device which is efficient and which is characterized by low power requirements.

A further object of the invention is to provide a fluid handling device which is able to transport ductlessly a fluid through a fluid for a considerable distance.

A still further object of the invention is to provide a fluid handling device which drives the outermost shells of a driven column of fluid at a more rapid rate than the shells closer to the center of the driven column.

And a still further object of the invention is to provide a fluid handling device by which it is possible to direct the movement of a fluid through another like fluid or through a dissimilar fluid.

Additional objects and features of the invention pertain to the particular structure and arrangements whereby the above objects are attained.

In order that the principle of the invention may be readily understood, a single embodiment thereof applied to an oxygenating device, but to which the application is not to be restricted, is shown in the accompanying drawing wherein:

FIG. 1 is a schematic side view of an oxygenating device constructed in accordance with the invention;

FIG. 2 is an enlarged, fragmentary, cross-sectional side view of the impeller and air chamber used in the oxygenating device of FIG. 1;

FIG. 3 is a view through the section 3—3 of FIG. 2;

FIG. 4 is an enlarged view through the section 4—4 of FIG. 2;

FIG. 5 is a further enlarged, fragmentary, cross-sectional side view of the hub portion of the impeller shown in FIG. 2;

FIG. 6 is a schematic side view of a modified oxygenating device constructed in accordance with the invention;

FIG. 7 is an enlarged view taken through the section 7—7 of FIG. 6 showing the impeller; and FIG. 8 is a further enlarged, fragmentary, cross-sectional side view of the hub portion of the impeller shown in FIG. 7.

Referring now in detail to the drawings, an oxygenating device shown generally at 10 is submerged in a lake 12 by being mounted to a concrete base or pedestal 14 that is anchored in a lakebed 16. It is to be understood that the oxygenating device may be equally well arranged to be buoyantly supported a given distance above the lakebed. It is further to be understood that the oxygenating device may be employed to advantage in bodies of water other than lakes.

The oxygenating device 10 is shown to include a floating buoy 18 having air inlet ports 20 disposed above the surface of lake 12. Buoy 18 is preferably hollow so that ports 20 can communicate with a flexible conduit or hose 22 that is secured to the lower end of the buoy.

The otherwise free end of hose 22 is coupled to a flanged pipe 24 by means of a clamp 26 in order to provide a continuous air passageway from the ports 20 to an intake chamber 28 to the walls of which the flanged pipe 24 is affixed.

Advantageously, a pair of bushings 30 and 32 are mounted co-axially in the walls 34 of intake chamber 28. By means of the bushing 30 and 32, a hollow shaft 36 can be extended rotatably through chamber 28 to couple an impeller 38 with a drive motor 40. Drive motor 40 is preferably a submersible electric motor connected to a suitable source of electric power, not shown. Furthermore, motor 40 is advantageously bolted or otherwise suitably secured to the pedestal 14, one of the walls 34 of intake chamber 28 being advantageously secured, in turn, to the housing of motor 40.

As will be recognized, it is important to fashion bushings 30 and 32 in such a manner as to prevent water from leaking into chamber 28. Likewise, flanged pipe 24 is advantageously provided with a gasketed seal in communication with the chamber 28.

The impeller shown generally at 38 is made up of a hub 42 and a number of impeller blades 44 which are suitably affixed to the hub 42. Each of the blades 44 is preferably truncated and preferably substantially flat except for a downstream-formed trailing outermost corner 45; and as best shown in FIG. 5, each of the blades 44 is preferably fashioned with a hollowed portion 46 which extends radially from the central bore 48 of hub 42.

Continuing with particular reference to FIG. 5, hub 42 is shown press fit onto the closed end 50 of shaft 36, shaft 36 being provided with a number of radial apertures 52 which communicate the hollowed portions 46 with the interior of shaft 36. For purposes which will become more apparent hereinafter, the impeller blades 44 are drilled with a number of minute holes 54 which communicate the hollowed portion 46 with the upstream side of the blades 44. Holes 54 are desirably of a size on the order of 0.0135 to 0.0150 inch in diameter.

Turning now to FIG. 4, shaft 36 is shown to be provided with a number of funnel-shaped, radially extending holes 56 disposed at intervals along shaft 36 within the confines of chamber 28. By tapering or flaring the holes 56 into the direction of shaft rotation which is indicated generally by arrow 58, movement of the shaft tends to scoop air from the chamber 28 into the interior of shaft 36. The holes 56 are preferably inclined forwardly to further encourage scooping of air into shaft 36.

Thus, rotation of shaft 36 tends to develop an increased pressure within the interior of shaft 36 and a reduced pressure within chamber 28 whereby air is drawn in through the ports 20, down through the hose 22 and into the intake chamber 28. Correspondingly, the increased pressure on the interior of shaft 36 tends to force air out of the several holes 54.

Considering the drive motor 40 to be energized and operating to rotate shaft 36 and therefore impeller 38, air will not only be urged through the several holes 54 by means of the increased pressure within the shaft 36 but also by the reduced pressure on the upstream side of the blades 44.

As is well known in the impeller art, "cavitation," i.e. a region of reduced pressure, tends to develop on the upstream side of impeller blades. In the present invention, such a region of reduced pressure is employed to draw fine bubbles of air through the minute holes 54; and as these fine bubbles ooze out of holes 54, rotation of the impeller tends to strip the bubbles from the back of the impeller blade. The subsequently passing blade picks up the previously stripped bubbles to drive them in a downstream direction, as indicated in FIG. 1 by the arrows 60.

The fineness of the bubbles is important to the success of the invention since very small or minute bubbles of air have little tendency to rise in water because of surface tension effects. Furthermore, minute bubbles tend to ahere to any object encountered. Hence, minute bubbles are exposed to the water for long periods of time; and there is a concomitantly greater opportunity for the oxygen in the bubble to dissolve.

The driven bubbles and their accompanying quantity of water form a column of fluid 62 which can be directed for considerable distances from the oxygenating device 10. Ease in directing this column 62 is facilitated by the increased rate of flow which occurs at the outermost or peripheral shells of the driven column 62, the column "exploding" into a cloud 64 at its terminus.

In one specific embodiment, employing a one fifty-fifth horsepower motor and a 1½-inch diameter impeller, a column of water approximately 50 feet in length has been attained. It is important to point out that the horsepower of the drive motor is more important to the volume contained within the driven column than to the distance which the column extends.

As will be recognized, additional dispersion of the air bubbles can be achieved by directing the column 62 into the path of naturally occurring currents. Furthermore, it is realized that dispersion can be increased by oscillating the oxygenating device 10 to cover a sector of the lake 12. In addition, dispersion can be achieved by mere intermittant operation. Successful dispersion in this latter instance results from the fact that movement of the water continues for a considerable period of time after the impeller has been stopped.

Turning now to FIG. 6, a modified oxygenating device 10a is shown submerged in a body of water 12a. The oxygenating device 10a advantageously includes an air intake 66 which is affixed to the upper end of a rigid pipe 68 so as to communicate with a chamber 28a through a valve 70. Valve 70 may be of any conventional type and is employed to regulate the volumetric intake of air to chamber 28a. Regulating the volumetric intake to chamber 28a controls the degree of aeration incurred through the operation of oxygenating device 10a and cooperates in controlling the size of the bubbles so as to insure the greatest absorptive effect.

Chamber 28a is defined by a housing 72 which is closed off by a plate 74, plate 74 being suitably affixed to housing 72 as by bolting. A motor 40a is adavntageously secured to plate 74 within the chamber 28a, motor 40a being coupled to an impeller 38a by a hollow shaft 36a which extends rotatably through a bushing 32a secured to housing 72. Enclosing motor 40a within the chamber 28a permits the air drawn in through pipe 68 to cool the motor 40a prior to its being directed into the body of water 12a through shaft 36a and impeller 38a.

Housing 72 may be suitably supported on a pedestal anchored in the floor of body of water 12a.

The impeller 38a includes a hub 42a having a number of impeller blades 44a affixed downstream therefrom. As shown in FIGS. 6 and 7, each of the blades 44a is fashioned to be cupped or concave in a generally downstream direction. Furthermore, each of the blades 44a is desirably inclined or angulated to face into the general direction of impeller rotation which is indicated by arrow 76. In addition, each of the blades 44a is fashioned with a downstream-formed trailing outermost corner 45a which may be achieved by bending the tip of the blade perpendicular to a line, such as is shown at 78, drawn to the opposite tip of the preceding blade.

Each impeller blade 44a also is desirably truncated as by having the tip of the blade cut off along the chord of a circle which is coaxial with hub 42a. A hollowed portion 46a extends radially to communicate the interior of shaft 36a with the upstream side of blades 44a through a number of minute holes 54a. This arrangement is best shown in FIG. 8. The several holes 54a are preferably arranged to be disposed adjacent the area of greatest velocity of blade 44a and in communication with the region of reduced pressure on the upstream side of the blades.

With continued reference to FIG. 8, hub 42a is shown secured to the end of shaft 36a by a set screw 80, whereas hollowed portions 46a communicate with the interior of shaft 36a through radial apertures 52a. Advantageously, the open end of shaft 36a is closed off by means of a screw 82 which engages cooperating threads in the open end of the shaft.

Shaft 36a is provided with a number of funnel-shaped, radially extending holes 56a which function in a manner similar to the holes 56 shown in FIG. 4.

As will become apparent, operation of the embodiment of FIGS. 6–8 proceeds in the same general manner as the embodiment of FIGS. 1–5.

While particular embodiments of the invention have been shown and described, it is to be understood, of course, that the invention is not to be limited thereto since many modifications may be made to adapt the invention to other uses. For example, the invention may be arranged to transport a ductless column of fluid through other fluids for various purposes, as might be desirable in conveying a column or barrier of heated air in a generally upward direction in order to prevent snow from falling on a specific location.

Therefore, it is contemplated to cover by the appended claims any such modifications as fall within the true spirit and scope of the invention.

The invention is claimed as follows:

1. A device for aerating a large body of water by driving a shaft of water with air entrained therein through said large body of water, comprising an impeller having a plurality of radially extending blades arcuately spaced substantially uniformly, means for supporting said device in a fixed position in a large body of water, means for rotating said impeller in a given direction, each blade having a leading edge and a trailing edge, said blade further having a downstream driving surface with a major portion forming an angle with a plane normal to the axis of the impeller and the trailing edge being disposed further downstream than the leading edge, said driving surface of each blade at the trailing edge of the blade further having at the outer extremity of the blade and for only a short distance in radially from the radial extremity of the blade a relatively small integral tip portion deflected further downstream at an obtuse angle to said major portion and with the surface of the tip portion meeting the surface of the major portion along substantially a line forming a substantial angle with an intersecting radius, said further deflected tip portion exerting greater thrust on the water than is exerted by the remainder of the blade and thereby directing water driven by said impeller in a coherent shaft free of mechanical restraint with a minimum of lateral dispersion until such shaft of water slows down markedly, said device having means for introducing air into the water immediately upstream of said blades in an area tending toward cavitation whereby said air is introduced into the shaft of water and is thereby dispersed in said large body of water over a large area.

2. A water aerating device as set forth in claim 1 wherein the outer ends of the blades are substantially truncated, and wherein the further deflected portion of each fluid driving surface thereby comprises a substantially triangular corner at the outer trailing edge of each blade.

References Cited in the file of this patent

UNITED STATES PATENTS

| | | |
|---|---|---|
| 1,097,991 | Sawyer | May 26, 1914 |
| 2,041,184 | Isenhour | May 19, 1936 |
| 2,121,458 | Vogelbusch | June 21, 1938 |
| 2,148,555 | Hicks | Feb. 28, 1939 |
| 2,442,639 | Curtis | June 1, 1948 |
| 2,825,542 | Jackson | Mar. 4, 1958 |

FOREIGN PATENTS

| | | |
|---|---|---|
| 15,947 | Great Britain | 1904 |